United States Patent
Sirois

(10) Patent No.: US 7,657,588 B2
(45) Date of Patent: Feb. 2, 2010

(54) DETECTION AND IDENTIFICATION OF STABLE PRI PATTERNS USING MULTIPLE PARALLEL HYPOTHESIS CORRELATION ALGORITHMS

(76) Inventor: Joseph A Sirois, 8 Ridgewood Dr., Amherst, NH (US) 03031

( * ) Notice: Subject to any disclaimer, the term of this patent is extended or adjusted under 35 U.S.C. 154(b) by 647 days.

(21) Appl. No.: 11/458,963

(22) Filed: Jul. 20, 2006

(65) Prior Publication Data

US 2006/0284755 A1 Dec. 21, 2006

Related U.S. Application Data

(62) Division of application No. 10/637,386, filed on Aug. 8, 2003, now Pat. No. 7,133,887.

(51) Int. Cl.
*G06F 17/15* (2006.01)
(52) U.S. Cl. .................. 708/422; 342/189
(58) Field of Classification Search ......... 708/422–426; 342/189
See application file for complete search history.

(56) References Cited

U.S. PATENT DOCUMENTS

| | | | |
|---|---|---|---|
| 3,881,101 A | 4/1975 | Pederson et al. | |
| 4,209,835 A | 6/1980 | Guadagnolo | |
| 4,516,220 A | 5/1985 | Baumann | |
| 4,721,958 A | 1/1988 | Jenkin | |
| H0513 H | 8/1988 | Dunne et al. | |
| 4,918,455 A | 4/1990 | Maier | |
| 5,063,385 A | 11/1991 | Caschera | |
| 5,565,764 A * | 10/1996 | Priebe et al. | 708/5 |
| 5,583,505 A | 12/1996 | Andersen et al. | |
| 5,990,833 A * | 11/1999 | Ahlbom et al. | 342/417 |
| 6,100,845 A | 8/2000 | Rose | |
| 6,163,297 A | 12/2000 | Rose | |
| 6,646,602 B2 * | 11/2003 | Krikorian et al. | 342/430 |
| 6,985,102 B1 * | 1/2006 | Horn et al. | 342/13 |
| 2003/0085831 A1 | 5/2003 | Lavoie | |

OTHER PUBLICATIONS

PCT International Search Report dated May 16, 2006 of International Application No. PCT/US04/25643 filed Aug. 5, 2004.
Granger, Eric et al, A What-and-Where Fusion Neural Network for Recognition and Tracking of Multiple Radar Emitters, Dec. 2000, pp. 1-33, Boston, MA.

\* cited by examiner

*Primary Examiner*—Tan V Mai
(74) *Attorney, Agent, or Firm*—Fitch, Even, Tabin & Flannery

(57) ABSTRACT

A linear detection method for determining correlation values associated with an estimated Pulse Repetition Interval (PRI) executed by a linear detection module of a correlation mask disposed on a digital signal processor is provided comprising: determining a correlation spread associated with a vector of Times-of-Arrival (TOA) data; determining a delta spread associated with the correlation spread; determining a first/next estimated PRI associated with the vector of TOA data; determining a first/next estimated PRI vector based on the first/next estimated PRI; determining a delta vector based on the first/next estimated PRI vector; determining a correlation weights vector based on the delta vector; determining a first/next correlation value based on the correlation weights vector; and in response to there being no additional PRIs to estimate, searching the correlation values for a highest correlation.

16 Claims, 11 Drawing Sheets

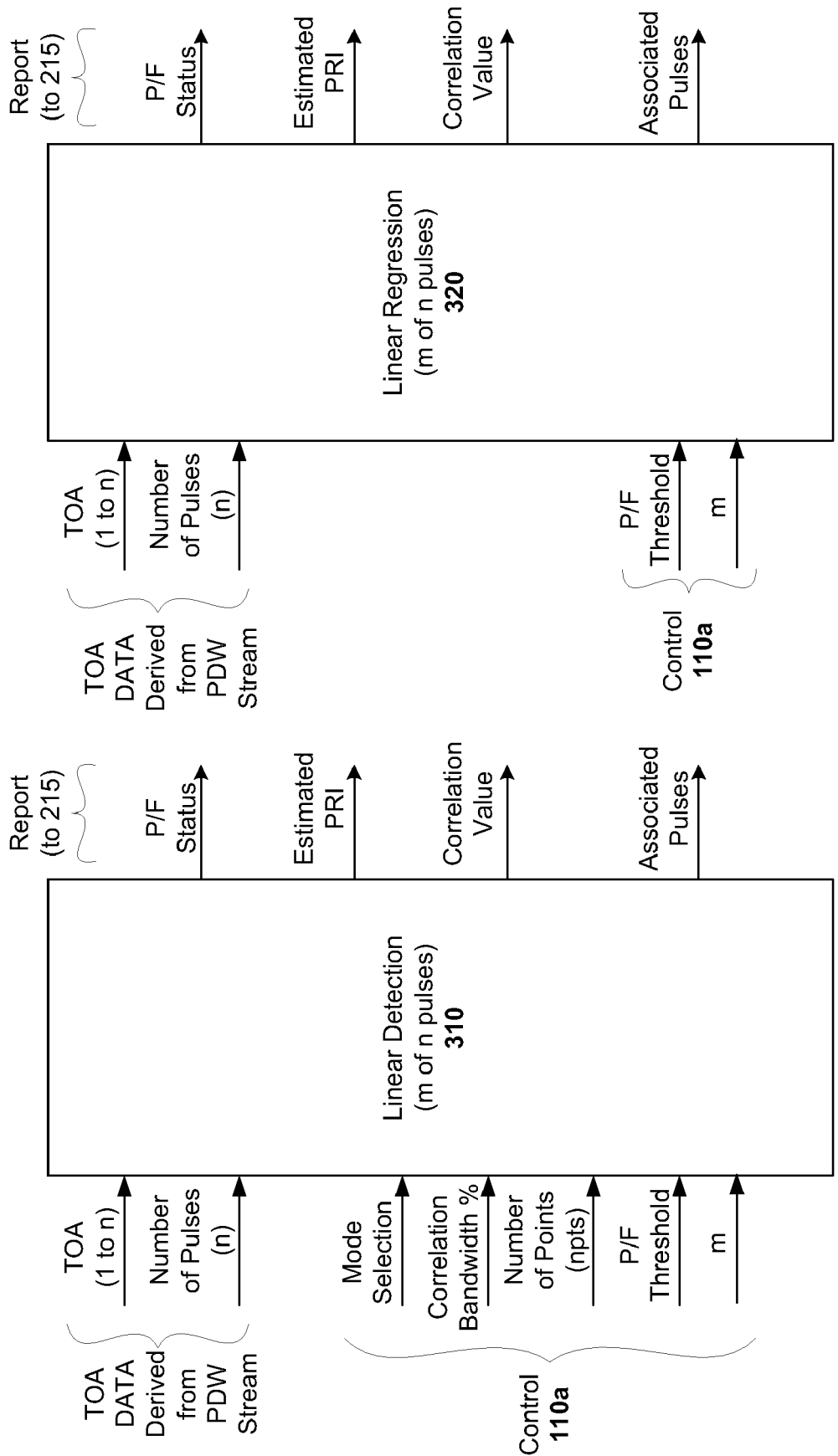

Iteration Number: 11

Normalized Pulse Set:

| 0 | 128 | 166 | 333 | 406 | 499 | 665 | 683 |
|---|---|---|---|---|---|---|---|

Delta TOA:

| 128 | 38 | 167 | 73 | 93 | 166 | 18 |
|---|---|---|---|---|---|---|

| Mask# | LD PRI | LD CORR | LD P/F | | LR PRI | LR CORR | LR P/F | | | Masked Data: | | |
|---|---|---|---|---|---|---|---|---|---|---|---|---|
| 20 | 166.3333 | 0 | 1 | | 166.4 | 0.2236 | 1 | 0 | 166 | 333 | 499 | |
| 37 | 166.3333 | 0 | 1 | | 166.3 | 0.2739 | 1 | 166 | 333 | 499 | 665 | |
| 41 | 170.0356 | -0.0036 | 0 | | 171.7 | 4.7513 | 1 | 166 | 333 | 499 | 683 | |
| 49 | 186.2333 | -0.0108 | 0 | | 183.1 | 8.2568 | 1 | 128 | 333 | 499 | 683 | |

Histogram Data:

| Linear Detection average PRIs: | 166.3333 | |
| --- | --- | --- |
| Linear Detection correlations: | -1.41E-05 | |
| Linear Detection average PRIs -- with LSB Applied: | | 3.33E-06 |

| Linear Regression average PRIs: | 168.1333 | 183.1 |
| --- | --- | --- |
| Linear Regression correlations: | 1.7495958 | 8.256815 |
| Linear Regression average PRIs -- with LSB Applied: | 3.36E-06 | 3.66E-06 |

Fig. 4c

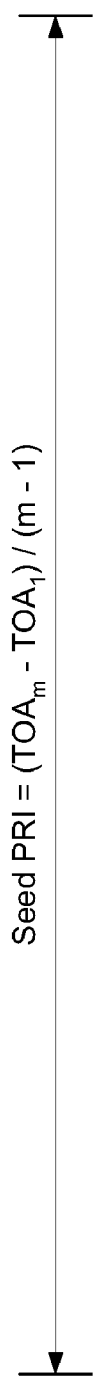
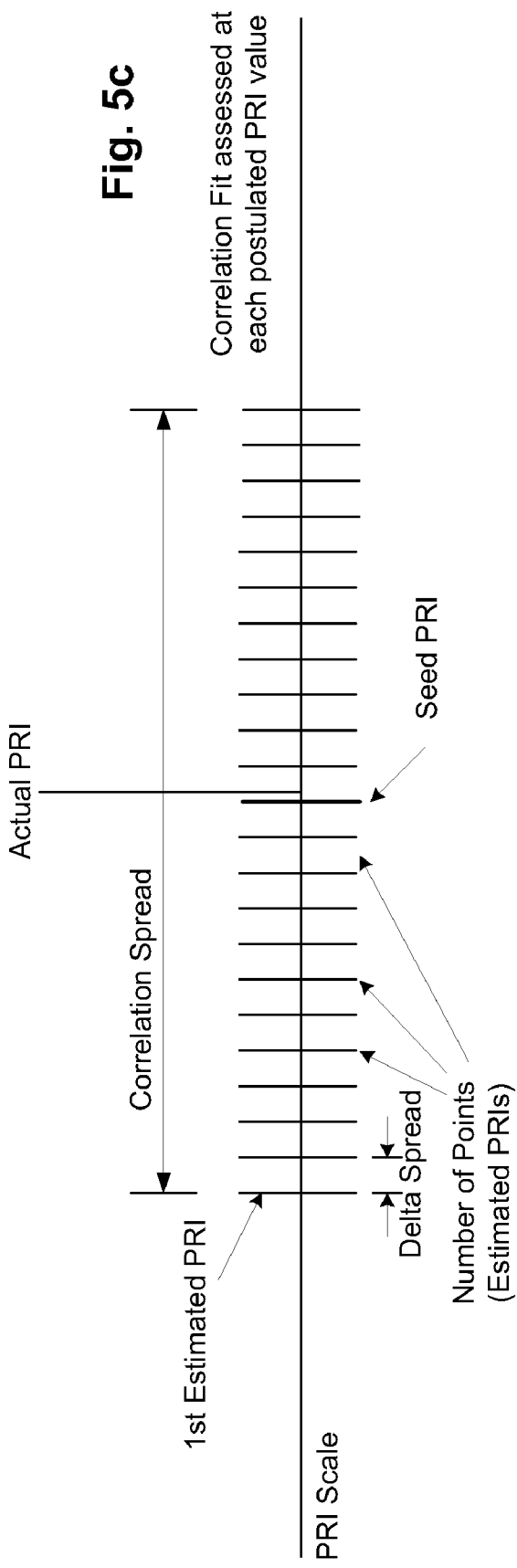
Fig. 5b
Fig. 5c

DETECTION AND IDENTIFICATION OF STABLE PRI PATTERNS USING MULTIPLE PARALLEL HYPOTHESIS CORRELATION ALGORITHMS

RELATED APPLICATIONS

This application is a divisional of U.S. application Ser. No. 10/637,386, filed Aug. 8, 2003, issued as U.S. Pat. No. 7,133,887 on Nov. 7, 2006, herein incorporated in its entirety by reference.

FIELD OF THE INVENTION

This invention relates to communications, and more particularly, to the detection and identification of stable PRI patterns using multiple parallel hypothesis correlation algorithms.

BACKGROUND OF THE INVENTION

Systems such as intelligence collecting systems, electronic countermeasure systems, and electronic support measures systems generally employ a wireless receiver. With the proliferation of wireless technology, such receivers typically receive many continuous wave and pulse signals (e.g., tens, hundreds or thousands, simultaneously) from different sources (commonly referred to as emitters) which are transmitting in the receiver's pass-band. Thus, the receiver must distinguish signals-of-interest from other signals, which requires separation of the individual signals. One effective means of separation of signals from different emitters is via identification of the pulse repetition interval (PRI) of pulses from each emitter transmission. There are many possible types of PRI patterns, ranging from a simple continuous wave signal, to stable (linear pattern), patterned (a repeating non-linear pattern), or random (no apparent pattern presented).

While identifying continuous waves is relatively simple, identifying complex PRI patterns is not trivial. Detection of PRI patterns has applications, for example, in the military arena, such as intelligence gathering missions, electronic countermeasures, and targeting. Likewise detection of PRI patterns has applications in the civilian arena, such as homeland security and police based intelligence gathering, and detecting the presence of interfering transmissions that may adversely affect air traffic control systems (e.g., jammers or spoofers).

Existing systems capable of PRI pattern recognition perform one or more aspects of known PRI deinterleaving and identification functions, of which there are many. Most of these functions are expert-system based, and look for pattern matches with respect to difference in times-of-arrival (TOA) of the measured input pulse data stream. Such conventional techniques are relatively slow in their execution times, as they have to perform exhaustive analysis of the input data to detect many, if not all, of the known PRI pattern forms that can be presented to and measured by the system. Thus, overall latency to detecting and reporting the presence of all emitters is relatively high. This latency is of particular concern when hostile or otherwise threatening emitters are present.

What is needed, therefore, are low latency techniques that identify PRI patterns within a collected pulse data, and associate pulses with the identified PRI patterns.

BRIEF SUMMARY OF THE INVENTION

One embodiment of the present invention provides a multiple correlation processor device configured to estimate PRI associated with a received pulse train. The device includes a first-type PRI detection module (e.g., linear detection module) that is adapted to analyze a set of TOA data associated with the received pulse train, and to estimate a PRI associated with that set. A second-type PRI detection module (e.g., linear regression module) is adapted to analyze the set of TOA data, and to estimate the PRI associated with that set. A multi-vote module (e.g. dual vote module) is adapted to determine if the estimated PRIs provided by the first-type and second-type detection modules are both passing with respect to predefined pass/fail thresholds.

In one such embodiment, each of the modules is included in a correlator mask, where the device includes a number of such masks. Each mask is configured for analyzing a subset of pulses included in the pulse train, thereby allowing for parallel processing. The PRI estimates output by the masks can be collected at an output stage, and filtered, thereby separating PRIs identified as stable from uncorrelated PRI data. Beneficially, only the uncorrelated PRI data is provided for the more complex (and inherently slower) signal processing algorithms to identify other PRIs present in the measured pulse train.

The PRIs identified as stable can be provided to a final analysis module adapted to perform one or more heuristic tests that assess the results provided by the linear detection, linear regression, or dual vote modules. The one or more heuristic tests performed by the final analysis module include, for example, at least one of a one signal present test, a one signal modulo test, a one signal remaining test, a two signals present test, and a two-phase stagger test. The final analysis module may further be configured to provide its output to a possible problem module that is adapted to perform a tie-breaker analysis when analysis performed by the final analysis module indicates a discrepancy.

Any one or all of the PRI analysis modules can be configured to output a corresponding report including at least one of an estimated PRI, a pass/fail status, a correlation value, and pulses associated with the estimated PRI. In addition, the device can be configured to receive control signaling which includes a mode select that causes the device to operate in one of a linear detection mode, a linear regression mode, or a dual vote mode. In one particular embodiment, each of the first-type and second-type modules is configured to output a corresponding report including a pass/fail status associated with the estimated PRI. This reporting enables the multi-vote module to determine if the estimated PRIs both passed. The amount of data that must be submitted for complex processing can thus be reduced with high confidence.

Another embodiment of the present invention provides a linear detection method for determining the correlation value associated with an estimated PRI. The method includes determining a correlation spread associated with the vector of TOA data, determining a delta spread associated with the correlation spread, and determining a first/next estimated PRI associated with the vector of TOA data. The method further includes determining a first/next estimated PRI vector based on the first/next estimated PRI, determining a delta vector based on the estimated PRI vector, determining a correlation weights vector based on the delta vector, and determining a first/next correlation value based on the correlation weights vector. In response to there being no additional PRIs to estimate, the method further includes searching a vector of the correlation values for the correlation value closest to zero or the otherwise best correlation value.

In one such embodiment, the method further includes the preliminary steps of receiving the vector of TOA data, normalizing the vector of TOA data, thereby providing a normalized vector of TOA data, and determining a seed PRI associated with the vector of TOA data. Determining the seed PRI includes, for example, dividing each element of the normalized vector of TOA data by n−1, where n=the number of pulses in the vector of TOA data.

Determining the correlation spread includes, for example, dividing the seed PRI by a correlation bandwidth percentage that defines a percentage bandwidth for searching for the estimated PRI. Determining the delta spread includes, for example, dividing the correlation spread by the (npts−1), where npts defines the number of points to search for the estimated PRI. Determining the first/next estimated PRI includes, for example, subtracting (correlation spread/2) from the seed PRI. Determining the delta vector includes, for example, subtracting the estimated PRI vector from a normalized vector of the TOA data. Determining a correlation weights vector includes, for example, squaring the delta vector. Determining the first/next correlation value includes, for example, dividing the sum of the correlation weights by the square of the seed PRI. A number of variations will be apparent in light of this disclosure.

In response to there being additional PRIs to estimate, the method may further include repeating the determining steps for each additional PRI, thereby forming the vector of the correlation values. Searching the vector of the correlation values includes, for example, comparing the correlation value closest to zero to a P/F threshold to determine a pass/fail status. The method may further include providing a linear detection report that includes at least one of a pass/fail status, the correlation value closest to zero, and a PRI estimate that corresponds to the that correlation value, and pulses associated with the PRI estimate.

Another embodiment of the present invention provides a dual vote method for determining the correlation value associated with an estimated PRI of a received pulse train. The method includes receiving a pass/fail status associated with an estimated PRI from each of a linear detection algorithm (or other "first-type" algorithm) and a linear regression algorithm (or other "second-type" algorithm). Each algorithm is configured to estimate PRI data of a pulse train. In response to each pass/fail status indicating a passing status, the method further includes setting the dual vote pass/fail status to pass for the corresponding PRI estimate. In response to at least one pass/fail status indicating a failing status, however, the method proceeds with setting a dual vote pass/fail status to fail for the corresponding PRI estimate.

The method may further include reporting a PRI estimate that is one of the following: the PRI estimate produced by either the linear analysis or the linear regression, an average of the PRI estimates provided by each of the linear analysis and the linear regression, or a default PRI. The method may further include collecting and filtering a number of reported PRI estimates, thereby separating PRIs identified as stable from uncorrelated PRI data. Such filtering allows only the uncorrelated PRI data to be provided for complex signal processing to identify other PRIs present in the pulse train. Downstream computational processing is therefore significantly reduced.

The method may further include performing one or more heuristic tests on the PRIs identified as stable. For example, performing one or more heuristic tests on the PRIs identified as stable may include performing at least one of a one signal present test, a one signal modulo test, a one signal remaining test, a two signals present test, and a two-phase stagger test. In response to results of the one or more heuristic tests indicating a discrepancy, the method may further include performing a tie-breaker analysis on the results of the one or more heuristic tests analysis.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 4a is a block diagram illustrating a linear detection module configured in accordance with one embodiment of the present invention.

FIG. 4b is a block diagram illustrating a linear regression module configured in accordance with one embodiment of the present invention.

FIG. 4c illustrates a table showing a specific case where both linear detection and linear regression were performed to provide a dual vote.

FIG. 5b is a pictorial view of a normalized vector of TOA data, having a PRI of p, that can be operated on by the linear detection algorithm of FIG. 5a, and an example seed PRI.

FIG. 5c is a pictorial view of estimated PRIs generated by the linear detection algorithm of FIG. 5a, along with the correlation spread, the delta spread, and the "number of points."

DETAILED DESCRIPTION OF THE INVENTION

Embodiments of the present invention operate to significantly speed up the process of PRI detection and reporting, relative to conventional techniques. Linear or otherwise stable based PRI signals included in the received data stream are detected, reported, and filtered out. The remaining signals (e.g., complex PRI signal types and unusual PRI phenomenon) of the received data stream are buffered, thereby forming a reduced set of input signals. This reduced set of signals can then be processed by conventional expert-system based pulse deinterleave and PRI identification algorithms, which are generally slower and more computationally intensive than the stable based algorithms described herein. However, the expert-system based algorithms are enabled to arrive at their conclusions sooner, since they have less overall data and signals to process.

Detection and identification of stable PRI patterns according to the principles of the present invention can be carried out in a number of ways using multiple parallel hypothesis correlation algorithms. For example, the multiple parallel hypothesis correlation algorithm may employ linear detection or linear regression. Alternatively, the multiple parallel hypothesis correlation algorithm may employ a combination of both linear detection and linear regression, thereby providing a "dual voting" scheme that decreases the occurrence of false positives. These algorithms operate to quickly identify stable PRI patterns within an input pulse set, allowing for the pulses associated with these stable PRI patterns to be deinterleaved or otherwise separated from the remaining pulses within the received data stream.

As a result, overall latency to detecting and reporting the presence of all emitters is reduced. In addition, application specific triggers can be set where in response to the detection of possible threatening stable PRI signals (e.g., high pulse repetition frequency signals), related events or responses (e.g., countermeasures) are cross-cued in a real-time fashion. Thus, the time delay and latency associated with conventional expert-system based algorithms is avoided. The disclosed algorithms can be employed in a number of receiver applications. For example, radar warning receivers (RWR), electronic support measures (ESM) systems, electronic intelligence (ELINT) systems, and/or electronic countermeasures (ECM) systems can all be configured to exploit the benefits of the present invention.

System Architecture

Figure 1:
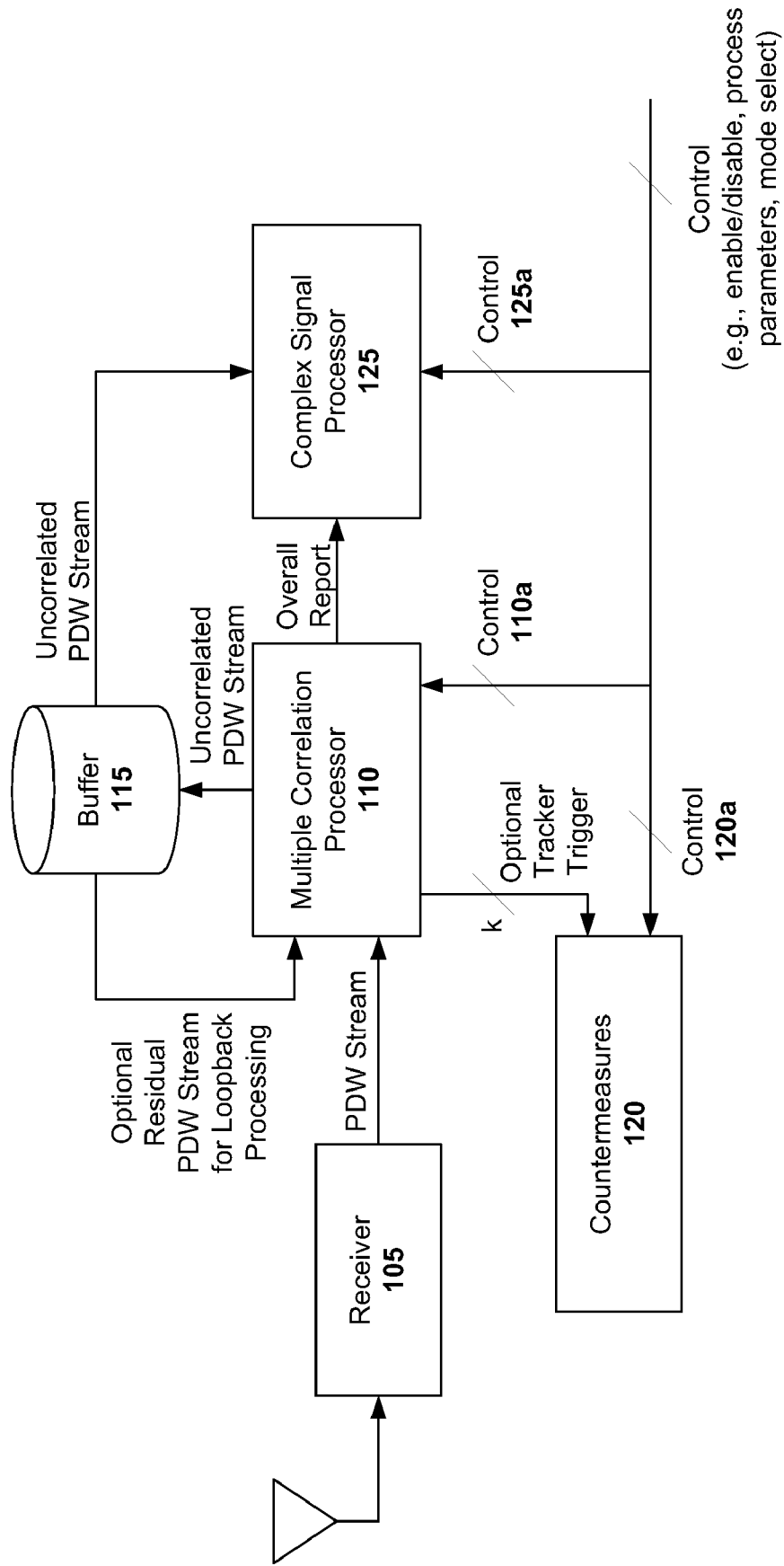
FIG. 1 is a block diagram illustrating a receiver configured with a multiple correlation processor in accordance with one embodiment of the present invention.

FIG. 1 is a block diagram illustrating a receiver configured with a multiple correlation processor in accordance with one embodiment of the present invention. As can be seen, the system includes a wireless receiver 105, a multiple correlation processor 110, a buffer 115, a complex signal processor 125, and a countermeasures system 120. A local host or control processor provides control, such a process parameters, enable/disable signaling, and mode selection.

In operation, wirelessly transmitted signals are received or otherwise intercepted (measured) by the antenna/receiver 105 pair for a radio frequency (RF) system. The received signals may typically include a mixture of continuous wave signals and pulsed signals, which have been simultaneously transmitted from a number of different source emitters. As such, the set of received and measured signals will likely overlap and be interleaved with one another in the resulting measured pulse data input stream. The receiver 105 may be implemented in conventional technology, and includes, for example, an analog front end, a demodulation section, and a pulse measurement unit. Any number of RF signal presence detection and measurement techniques can be employed here.

Among other conventional processing, the receiver 105 measures parameters of pulses included in the received signal, such as pulse amplitudes, pulse widths, TOA, and carrier frequency. Depending on the application, other parameters may be measured as well. For example, a direction-finding (DF) receiver may also measure the phase differences between several receive antennas at the same instant in time in order to support DF algorithms that produce line of bearing (LOB) estimates, while advanced receivers may also measure the modulation on pulse characteristics to improve both emitter identification and pulse signal separation and deinterleaving. The measured parameter values for each pulse can then be assembled into a pulse descriptor word (PDW) or like data structure. The resulting PDW stream is then provided to the multiple correlation processor 110, which is adapted to identify linear or otherwise repeatable patterns in the pulses included in the stream.

Stable portions of the PDW stream are correlated using at least one of linear detection, linear regression, or dual vote techniques as described herein. Portions of the PDW stream that remain uncorrelated (e.g., due to non-linearities or non-repeatability) are buffered so that they can be analyzed by conventional complex signal processor 125. The resulting overall correlation report provided includes, for example, the estimated PRI, the correlation value, the associated pulses, and the pass/fail status of each correlation attempt. This report is provided to the processor 125, which operates only on the uncorrelated PDW stream. The multiple correlation processor 110 may be configured to operate in a number of modes.

In one embodiment, the operation modes include: batch, stream, tracker, and loop back. The batch mode is where the pulse data to be processed is provided one input set at a time (i.e., in batches). No knowledge of prior executions or data is necessary. Typical applications for this mode can be real-time, not time constrained, or non-real time post processing of the data. The stream mode is where the pulse data is provided in a streaming first-in-first-out (FIFO) fashion, and the processor 110 processes n pulses at a time, dropping the oldest pulse, and including the newest pulse in the next iteration of processing.

The benefits of the streaming mode are at least two-fold: first, depending on the depth of the stream, the number of masks that need to be calculated at any one iteration can be less; and second, as new pulses are measured, they can be correlated with already associated pulses, further facilitating pulse ID and deinterleaving aspects of the algorithm. The depth of the stream can be as large as n−1 pulses, or a small as 1. For example, if the algorithm was running a 4-of-8 (70 masks) configuration, pulses 1 through 8 can be assessed in the first batch run, followed by pulses 2 through 9 for the second run, and so on. If the same PRI (within tolerance) was found in both runs, and the new pulses were associated with all of the remaining old pulses, the new pulses are associated, resulting in the signal train being built up in real-time.

By implementing a streaming approach, the number of masks that needs to be calculated at one time does not need to approach 70. For example, in a 4-of-8 streaming approach, after 4 pulses only mask #1 can be calculated. After the fifth pulse arrives, mask #2 need not be calculated because it uses the same 4 pulses that mask #1 just used. Mask #1 needs to be performed again for the new fifth pulse. In addition, three other masks can now be performed. For instance, given pulses with TOA 10, 20, 30, 40 and 50 respectively (with 50 being the fifth and latest pulse measured), the three other masks would be: mask a: 10, 20, 30, 50; mask b: 10, 20, 40, 50; and mask c: 10, 30, 40, 50. Note that adding the eighth pulse to the set would only require 35 and not 70 masks to be calculated. This aspect is significant if computation space is a concern, which might be the case if larger sets, such as 4-of-12 (requiring 495 masks) or larger, are to be executed.

The tracker mode is where a streaming approach is implemented with the additional tasking that processor 110 trigger an action whenever a certain PRI range (or ranges) condition has been detected. A flag can be returned or an interrupt can be issued for this detection. The example application shown in FIG. 1 is with a countermeasures system 120 that requires a fast detect and response (real-time) approach to a perceived threat signal. Note, however, that other trigger based subsystems or processes can be included here as well. Further note that any number k of triggers can be set up between the processor 110 and the system 120.

For applications that use multiple parallel hypothesis correlation (as will be explained herein), the loop back mode of operation can be employed in conjunction with a batch mode. In this mode, the uncorrelated pulses or otherwise residual pulses (those not correlated to an estimated PRI) are collected in buffer 115 over a period of many prior detection attempts. Once the buffer 115 is full or a time-out occurs, the uncorrelated pulses are either (based on control choices for the implementing program) reissued to processor 110 for a subsequent loop-back correlation attempt, or sent directly to the complex signal processor 125 for advanced pulse deinterleaving and PRI identification processing. A typical application here would be to address very low frequency stable PRI signals that do not present enough individual pulses in a nominal collection time window for the system. In any one collection of pulses only a small number, perhaps only 1 pulse from such a low frequency emitter may be present. By holding a residual pulse buffer, and then periodically re-analyzing the data for linearity, these linear pulse trains would eventually be detected via the algorithms described herein.

Note that the multiple correlation processor 110 receives control 110a, which includes various process parameters, mode selects, and other pertinent control signaling as will be apparent in light of this disclosure. Further note that the embodiment of FIG. 1 was selected for the purposes of robust disclosure, and various features and componentry are optional. The present invention is not intended to be limited to any one such configuration.

As previously indicated, the receiver 105, the buffer 115, the countermeasures system 120 (or other triggered system), the complex signal processor 125, and the controlling host/processor that provides the control can all be implemented in conventional technology. Functional and structural accommodations that enable their respective interfacing with the inputs and outputs of the processor 110 will be apparent in light of this disclosure.

The multiple correlation processor 110 may be implemented in hardware, software, firmware, or any combination thereof. For example, the processor 110 can be implemented in special purpose semiconductor technology, such as an FPGA or an ASIC. Alternatively, the processor 110 can be implemented as a set of instructions executing on a digital signal processor or other suitable processing environment. The structure and functionality of the processor 110 will be discussed in greater detail with reference to FIGS. 2-7.

Multiple Correlation Processor

Figure 2:
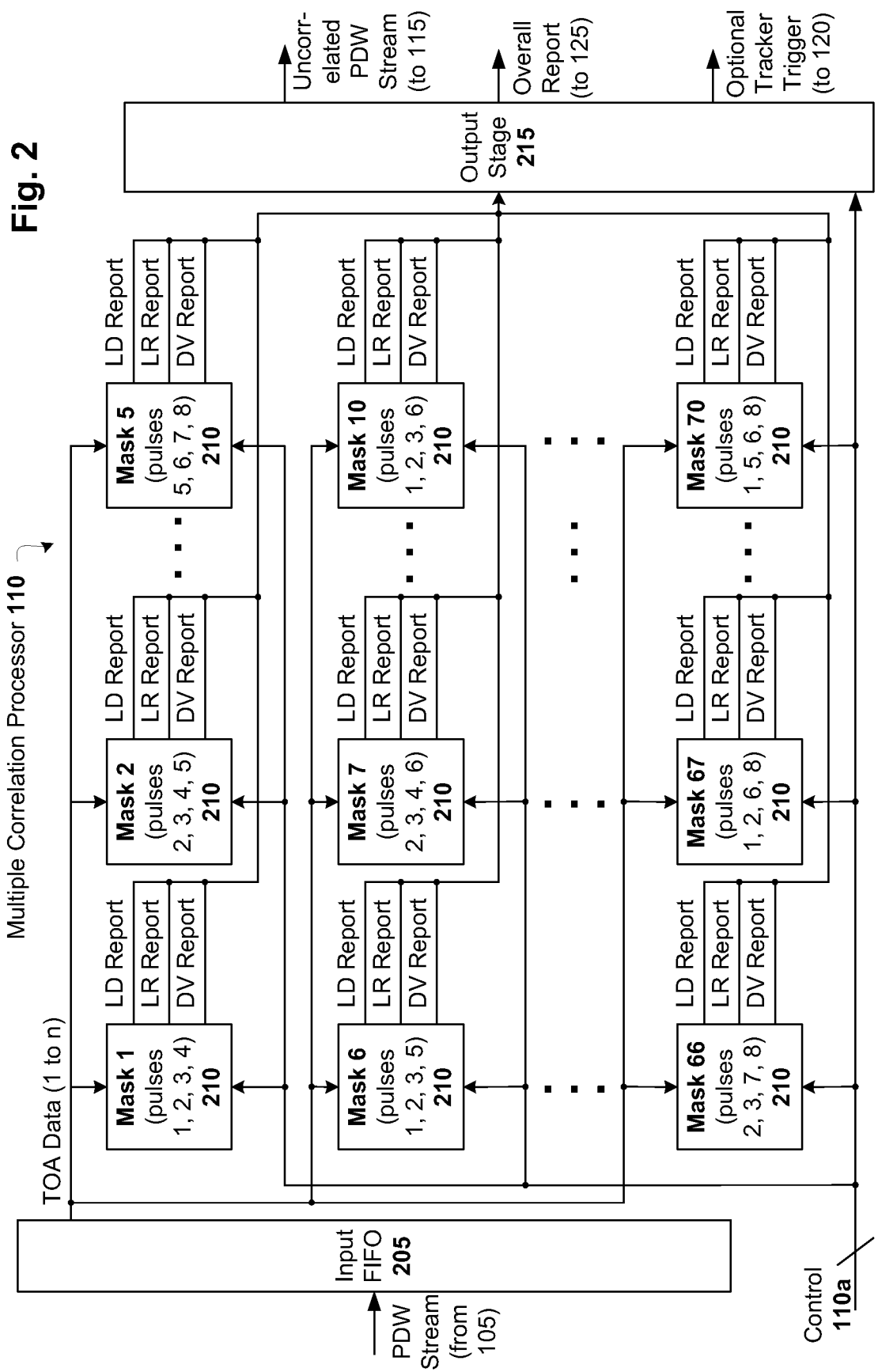
FIG. 2 is a block diagram illustrating a multiple correlation processor configured in accordance with one embodiment of the present invention.

FIG. 2 is a block diagram illustrating a multiple correlation processor configured in accordance with one embodiment of the present invention. This processor 110 includes a FIFO buffer 205, a multiple simulation parallel hypothesis set of correlator masks 210, and an output stage 215. Control 110a is provided to each of the masks 210, with the PDW stream being provided to FIFO 205. The overall output report, uncorrelated PDW stream, and optional tracker trigger output are provided at the output of the output stage 215.

TOA data (included in the PDW stream) for pulses 1 to n are provided to each mask 210. The multiple correlator mask 210 approach provides a dimension of simultaneous parallel hypothesis by running x masks 210, where $x=n!/[m!*(n-m)!]$, n=the total number of pulses in the set, and m=the number of pulses to be considered in each mask. In this particular example, m equals four and n equals eight. Thus, 4-of-8 pulses are analyzed by each mask, resulting in up to seventy simultaneous masks 210 being processed.

Note, however, that other mask configurations can be used here as well. For instance, 4-of-12 masks could be employed to provide a total mask set of 495 masks. Such a mask set enables detection of the presence of up to three independent stable signals within twelve pulses. Generally stated, each mask could operate on three or more of the n pulses provided to each mask. The values of m and n may be varied as necessary and will depend on the particular application and desired performance, as will be apparent in light of this disclosure.

Each mask 210 individually executes at least one of a linear detection (LD) algorithm, linear regression (LR) algorithm, or a dual vote (DV) algorithm. Depending on the analysis mode selected, a corresponding report (e.g., LD report, LR report, or DV report) is generated by each mask 210 to the output stage 215. The output stage 215 then processes the x individual reports into an overall report. Note that even when all pulses considered are from the same signal, are linear in pattern, and are consecutive, only a subset of the masks 210 will actually be presented with linear patterned pulse data. This is because only m pulses out of n are presented to each mask 210.

Assume, for example, that perfectly linear, consecutive data is presented to the processor 110. Further assume each mask 210 receives four out of eight pulses, with a total of seventy masks 210. Of the seventy masks 210, five will be presented with consecutive indexed pulse data: mask 1 (pulses 1, 2, 3 and 4) through mask 5 (pulses 5, 6, 7 and 8). Each of these five masks are presented with 1N PRI data, with 1N representing the difference in TOA between consecutive pulses (N being the actual PRI value). In addition, by skipping every other pulse, mask 48 (pulses 1, 3, 5 and 7) and mask 49 (pulses 2, 4, 6, 8) will be presented with "2N" consecutive PRI data. Thus, two PRIs are found: the 1N PRI and the 2N PRI. Further, note that the 2N PRI is a modulo of the 1N PRI. This information can be used to associate the two PRIs as being from the same signal.

The individual results of the each mask 210 analysis is provided in the corresponding report to the output stage 215. Depending on implementation preferences, the output stage 215 can implement zero, one, or multiple analysis techniques as a part of the correlation algorithm. Note that some embodiments of the multiple correlation processor 110 do not employ the analytical sections of the output stage 215, thereby allowing the resulting matrix of individual mask results to provide the basis for the overall report. Further note that the processor 110 can be operated in the batch or stream modes, as well as in the optional tracker and loop back modes, depending on the application. Additional details of the output stage 210 function and architecture will be discussed in reference to FIGS. 3 and 4d.

Masks and Output Stage

Figure 3:
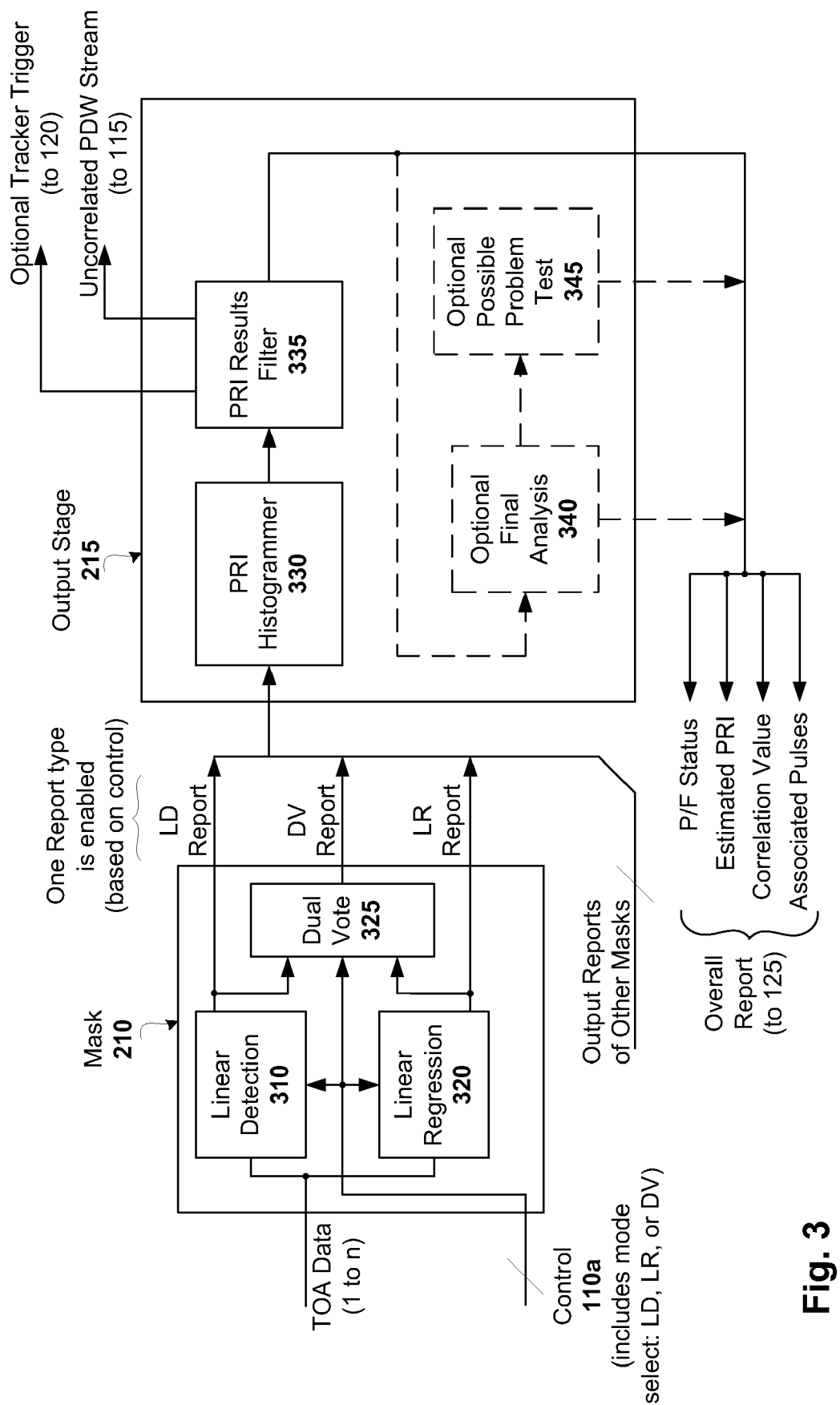
FIG. 3 is a block diagram illustrating one of the correlation masks and the output stage of the multiple correlation processor shown in FIG. 2.

FIG. 3 is a block diagram illustrating one of the masks and the output stage of the multiple correlation processor shown in FIG. 2. Each mask 210 includes a linear detection module 310, a linear regression module 320, and a dual vote module 325. TOA data for pulses 1 to n is provided to each of the linear detection 310 and linear regression 320 modules, while control 110a is provided to each module. The control 110a includes the analysis mode (LD, LR, or DV) in which the mask 210 will operate. Each of the linear detection 310 and linear regression 320 modules provides a corresponding report (LD report or LR report) to the dual vote module 325. Depending on what analysis mode is enabled, the corresponding report is output (e.g., onto a bus along with corresponding reports from other masks 210). The individual output reports are provided to the output stage 215.

In this embodiment, the output stage 215 includes a PRI histogrammer module 330, a PRI results filter 335, an optional final analysis module 340, and an optional possible problem test 345. Note that the final overall report can be based on the output of the PRI results filter 335. Alternatively, the output report can be based on the output of the final analysis 340. Alternatively, the output report can be based on the output of the optional possible problem test 345. In general, the amount of analytical testing performed by the output stage 215 can vary depending on the degree of desired confidence in the PRI estimates. Further note that any optional testing performed after the PRI result filtering by 335 can be integrated into the conventional higher-stage processing performed by the complex signal processor 125.

The first analysis process performed by the output stage after the x mask results are determined, is to histogram the entire set of passing masks with respect to their PRI and correlation values. This histogramming is carried out by module 330, and can be based on a % PRI tolerance included in the control 110a (e.g., default PRI tolerance=10%). After the histogramming function is accomplished, a filtering function is performed by module 335 to remove lower quality PRI results from the histogrammed set. The overall report provided by the output stage 215 includes the pass/fail status, the estimated PRI, and the correlation value associated with the correlation attempt. In addition pulses associated with the reported estimated PRI are identified.

The PRI filtering can be based on a correlation bandwidth % tolerance included in the control 110a. The correlation results that are within the % correlation tolerance of the best passing correlation result are passed. For example, for a linear detection $R^2$ form analysis having a pass/fail threshold of −0.00225, the acceptable delta correlation tolerance would be 0.00045, given a default correlation tolerance of 20%. Likewise, for a linear regression analysis having a pass/fail threshold of 10, the acceptable delta correlation tolerance would be 2. The filtered output of module 335 can then optionally be provided for additional analysis as discussed herein. Note, however, that such optional analysis is not necessary to practice the present invention. Additional outputs from module 335 include the uncorrelated PDW stream (based on P/F status) and the optional tracker trigger (when the tracking mode is enabled).

This histogram approach with filtering based on the individual passing masks actual correlation values can be used to arrive at a composite/average of PRI values received from the masks 210. Additional optional analysis after the PRI filtering of module 335 includes, for example, analytical checks to see if no signal, one signal, two signals, or one 2-phase signal has been found. This analysis can be carried out by module 340, which may be configured to search for PRI values that are whole multiples of the lower histogrammed PRI.

A number of optional individual test cases can be assessed by final analysis module 340, leading to a conclusion as to what type of results (e.g., linear or non-linear) have been determined, which will be discussed in reference to FIG. 4d.

Other optional supplemental analysis may be provided as well, such as that performed by possible problem test module 345. This module is used as a "tie-breaker" analysis when the previous analysis performed by module 340 indicates a discrepancy or other possible problem. This type of test can generally be employed when n is larger than m (m=4, n=8).

Three analysis algorithms carried out by each mask 210, including linear detection, linear regression, and dual vote, will now be discussed with reference to FIGS. 4a and 4b.

Linear Detection (LD)

FIG. 4a is a block diagram illustrating a linear detection module 310 configured in accordance with one embodiment of the present invention. The TOA input data, which is derived from the PDW stream provided by the receiver 105, includes TOA 1 to n, and the number of pulses, n. The control data 110a includes mode selection, correlation bandwidth %, number of points (npts), pass/fail threshold, and the number of pulses to be considered in each mask, m. The individual report output by the linear detection module 310 includes pass/fail status, estimated PRI, correlation value, and associated pulses identified by that particular mask.

The linear detection algorithm is modeled using concepts based on correlation interferometry direction finding approaches. Thus, squared terms can be used for the weights and the normalization factors (as with the $R^2$ form). However, the squared terms can be replaced as well (as with the R form). Both linear detection forms perform equally well. However, given that the R form is less computationally intense, it may be a more practical implementation than the $R^2$ form in some cases. Pseudo-code for each linear detection form ($R^2$ and R) is provided to further define the architecture and functionality of the module 310. First, an explanation of the parameters employed by each algorithm is provided.

Parameter n is the number of input pulse TOA values (from n PDWs) to be processed simultaneously in parallel for a given set of masks. Parameter m (for all of the correlation masks of a given set) is the number of consecutive pulses that must be present in the input pulse data set, for which the algorithm is looking to declare if a linear pattern is present or not. The performance of the algorithm in terms of PRI estimation accuracy generally increases with the number of pulses. However, as m increases, the vulnerability to a missing pulse in the input pulse data set increases, which decreases the likelihood that the linear detection algorithm would declare a linear pattern is present in the data set. Recall that control parameter m is the number of pulses to be considered in each mask, and can be set as previously discussed. Seventy masks 210, with each mask analyzing 4-of-8 pulses (i.e., m=4, and n=8) is one particular embodiment.

The mode selection input includes, for example, an analysis mode selection (e.g., linear detection, linear regression, or dual vote mode), as well as an operation mode (e.g., batch, stream, tracker, loop back mode, or a combination mode, such as a streaming mode with loop back and/or tracker modes enabled). The correlation bandwidth % input parameter defines the percentage bandwidth for searching for the estimated PRI. Note that as the correlation bandwidth % input parameter increases, the number of points (npts) should also increase to avoid under-sampling the PRI estimation domain. A typical range for correlation bandwidth % is about 10% to 20%, although others are possible. The benefit of larger correlation bandwidth % s (>20%) may not justify the calculation space, while smaller bandwidths (<10%) may be sensitive to noise/transmission or measurement jitter, and may not cover the PRI value.

The number of points (npts) parameter defines the number of points to search for the estimated PRI. Typically, 15 or 31 points are sufficient, although other npts values can be used as well if so desired. In one particular embodiment, the correlation bandwidth % is about 20% with an npts of 31. The pass/fail threshold input parameter is the threshold an estimated PRI must satisfy in order to be declared linear. The P/F threshold can be set to allow the algorithms to declare the presence of a single linear pattern even with relatively noisy individual TOA values. Note that the ideal linear pattern contains no noise amongst its respective TOA values, with an example being TOAs that increase in units of 100 (0, 100, 200, 300, and so on). Further note that less than ideal TOA values from an emitter transmitting a stable linear signal can exist due to a variety of conditions, such as: 1) the emitter is not precise with respect to current receiver standards in the clocking out/transmitting of its' individual pulses; 2) the receiver measuring the incoming individual pulses is not highly accurate in its' measurements on the time of arrival of each incoming pulse; and 3) the receiver measuring the incoming individual pulses creates small sampling errors regarding the exact TOA values due to employing a clock rate that is not infinitely large with respect to the range of possible delta TOA values. Even a system that has a 50 MHz clock can only sample and measure TOA values to a resolution of 20 nanoseconds.

Note, however, that by tightening the P/F threshold, the number of false positives can be reduced. In one particular embodiment, the P/F threshold for linear detection using the $R^2$ technique is −0.00225, and linear detection using the R technique is −0.04743 (i.e., square root of 0.00225). One option to consider is an estimation of the SNR of the input pulse data set. The higher the SNR, the tighter the P/F threshold should be. However, as the P/F threshold is tightened, the linear detection algorithm's ability to recognize a PRI stable/linear signal that has slight non-linearity due to an intentional or unintentional transmission or receiver affects can be diminished.

Linear Detection—$R^2$ Form Pseudo-Code (for a Single Mask)

Given the following:

$m$ = the number of TOAs to be evaluated for linearity $v$ = the vector of TOA within the input set $v = [T_1, T_2, \ldots T_m]$ $= v(1) = T_1; v(2) = T_2, \ldots v(m) = T_m$ $bw$ = the correlation bandwidth % for searching for the estimated PRI (e.g., range:1 to 200%) and $npts$ = the number of points to search for the estimated PRI Then the following pseudo-code can be employed to determine the estimated PRI and the correlation value:

```
nv = the vector of normalized TOA
nv(1) = 0; nv(2) = v(2) − v(1); nv(3) = v(3) − v(1); ... ; nv(m) = v(m) − v(1)
s_pri = the seed PRI estimate = nv(m) / (m−1)   (coarse PRI estimate)
spread = s_pri * bw                              (range covered for PRI estimates)
min_pri = s_pri − (spread / 2)                   (generate first estimated PRI trial)
ds = spread / (npts − 1)                         (generate delta between PRI trials)
temp_pri = min_pri                               (initialize for loop)
corr = correlation value = −9999                 (initialize for loop)
PRI = PRI estimate = min_pri                     (initialize for loop)
Loop:      For I = 1 to npts
    cv = [0, temp_pri, 2*temp_pri, ... (m−1)*temp_pri] (generate candidate
                                                         correlation vector)
    dv = v − cv                                   (vector subtraction-->
    dv = [0, v(2) − cv(2), ... v(m) − cv(m)]         producing delta vector)
    wtv = dv²                                     (generate weights vector)
    wtv = [0, dv(2)², ... dv(m)²]
    sumwts = 0 + wtv(2) + ... wtv(m)              (generate sum of the weights)
    temp_corr = − sumwts / s_pri²                 (gen. correlation value, normalize)
    If (temp_corr > corr) Then                    (If better correlation result found)
              corr = temp_corr                    (save this correlation result)
              PRI = temp_pri                      (save this PRI estimate)
    End If
    let       temp_pri = temp_pri + ds            (move to next trial PRI estimate)
End Loop
```

Linear Detection—R Form Pseudo-Code (for a Single Mask)

Given the following:

$m$ = the number of TOAs to be evaluated for linearity $v$ = the vector of TOA within the input set $v = [T_1, T_2, \ldots T_m]$ $= v(1) = T_1; v(2) = T_2, \ldots v(m) = T_m$ $bw$ = the correlation bandwidth % for searching for the estimated PRI (e.g., range:1 to 200%) and $npts$ = the number of points to search for the estimated PRI Then the following pseudo-code can be employed to determine the estimated PRI and the correlation value:

```
nv = the vector of normalized TOA
nv(1) = 0; nv(2) = v(2) – v(1); nv(3) = v(3) – v(1); ... ; nv(m) = v(m) – v(1)
s_pri = the seed PRI estimate = nv(m) / (m–1)     (coarse PRI estimate)
spread = s_pri * bw                               (range covered for PRI estimates)
min_pri = s_pri – (spread / 2)                    (generate first estimated PRI trial)
ds = spread / (npts – 1)                          (generate delta between PRI trials)
temp_pri = min_pri                                (initialize for loop)
corr = correlation value = –9999                  (initialize for loop)
PRI = PRI estimate = min_pri                      (initialize for loop)
Loop:       For I = 1 to npts
    cv = [0, temp_pri, 2*temp_pri, .... (m–1)*temp_pri] (generate candidate
                                                        correlation vector)
    dv = v – cv                                   (vector subtraction –>
    dv = [0, v(2) – cv(2), ... v(m) – cv(m)]       producing delta vector)
    sumwts = 0 + dv(2) + ... dv(m)                (generate sum of the weights [dv])
    temp_corr = – sumwts / s_pri                  (gen. correlation value, normalize)
    If (temp_corr > corr) Then                    (If better correlation result found)
                corr = temp_corr                  (save this correlation result)
                PRI = temp_pri                    (save this PRI estimate)
    End If
    let         temp_pri = temp_pri + ds          (move to next trial PRI estimate)
End Loop
```

Linear Regression (LR)

FIG. 4b is a block diagram illustrating a linear regression module 320 configured in accordance with one embodiment of the present invention. Just as with the linear detection module 310, the TOA input data is derived from the PDW stream provided by the receiver 105, and includes TOA 1 to n, and the number of pulses, n. The control data 110a for linear regression analysis mode includes the pass/fail threshold, and the number of pulses to be considered in each mask, m. The individual report output by the linear regression module 320 is the same as the report of the linear detection module 310, and includes pass/fail status, estimated PRI, correlation value, and associated pulses identified by that particular mask.

The following pseudo-code further defines the architecture and functionality of the linear regression module 320. The discussion related to the relevant parameters and trade-offs in reference to FIG. 4a equally applies here. For example, the ability of the linear regression algorithm to declare a linear pattern present is also dependent on m, which is the number of consecutive pulses being searched for within the data set. An example P/F threshold for linear regression is 10. Other parameter settings are comparable to those of the linear detection algorithm.

Linear Regression Form Pseudo-Code (for a Single Mask)
Given the following:

$m$ = the number of TOAs to be evaluated for linearity $v$ = the vector of TOA within the input set $v \equiv [v(1) = T_1; v(2) = T_2, \ldots v(m) = T_m]$ Then the following pseudo-code can be employed to determine the estimated PRI and the correlation value:

y = the transpose of v      y =    [ $T_1$,
                                     $T_2$,
                                     .
                                     .
                                     $T_m$ ]

-continued weight = the vector 0.5 * [(1–m), (1–m+2), (1–m+4), ... (m–1)] = [$w_1, w_2, \ldots w_m$]
(Note that the weight vector will have n entries, and each entry will be 1.0 units larger than the previous. Further note that weight can be pre-calculated since it is not dependent on the input TOA data.)
scale = 1.0 / (sum (weight**2)) = 1.0 / [$w_1^2 + w_2^2 + \ldots + w_m^2$]
mean_estimate = sum (y) / m = [$T_1 + T_2 \ldots T_m$] / m
PRI_estimate = scale * weight * y =  scale * [$w_1, w_2, \ldots w_m$] *
       [ $T_1$,
                                     $T_2$,
                                     .
                                     .
                                     $T_m$ ]
wt = transpose of w
error = y – mean_estimate – PRI_estimate*wt
      = [$T_1$ – mean_estimate – PRI_estimate *$w_1$,   =
[$E_1$,
      $T_2$ – mean_estimate – PRI_estimate*$w_2$,
$E_2$,
       .
       .
      $T_n$ – mean_estimate – PRI_estimate*$w_m$]        $E_m$]
sigma_estimate = (the "quality factor" = [sum(error$_2$) / m ]$^{1/2}$ =
   [($E_1^2 + E_2^2 \ldots + E_n^2$) / m ]$^{1/2}$
Note that the sigma_estimate represents the correlation value for pass/fail determination.

Dual Vote (DV)

This analysis mode employs both linear detection and linear regression, and adds the additional constraint that only passing masks from both the linear detection algorithm and the linear regression algorithm are to be considered for final analysis. In this sense, only masks that unanimously pass a multiple vote are declared passing. In this embodiment, the dual vote is performed for each mask 210 individually. A dual voting scheme greatly reduces errors prone from the linear detection and the linear regression algorithms when multiple signals are present and their respective TOA are walking through one another. In the case of using a 4-of-8 mask approach, seventy individual dual voting cases (or some subset thereof) would be combined together to form the dual voting, multiple simulation parallel hypothesis mask set.

In operation, the dual vote module 325 receives the respective reports from the linear detection module 310 and the linear regression module 320. As previously explained, each report includes a pass/fail status. The dual vote module 325 can be configured, for example, as a logical AND gate (hardware or software). The output of the gate is true (i.e., indicative of linearity) only when both inputs are true (i.e., indicative of a passing status for both the linear detection and linear regression algorithms). Other dual vote schemes will be apparent in light of this disclosure, whether they are based in logic (e.g., gates or masks) or other P/F status evaluation techniques (e.g., summer circuit where the circuit's output must exceed a threshold that indicates a positive dual vote was achieved).

In the dual vote mode, the estimated PRI and correlation value of the overall report can take a number of forms. For example, given a passing data set (e.g., based on the P/F threshold), the estimated PRI and correlation value of the overall report can automatically default to the estimated PRI and correlation value provided by either the linear detection or linear regression analysis. As the linear detection and linear regression algorithms perform equally well, the default for purposes of final reporting would be fairly arbitrary. A significant point here is that when an individual mask passes the dual vote check, the same set of evaluated pulses have a resultant very high probability that they are: 1) from the same transmitting emitter; and 2) part of a linear stable RF signal transmission.

Other approaches for the final reporting of the estimated PRI and correlation value when running in the dual vote mode will be apparent in light of this disclosure. For example, the estimated PRI and correlation value of the overall report can automatically be set to the estimated PRI value whose correlation value is closest to the ideal correlation value. Note that since the correlation values for linear detection and linear regression are not on the same scale, a conversion of one scale to the other is required in order to evaluate which of the two passing linear detection or linear regression correlation values is closer to the ideal. This can be accomplished via normalizing both scales to a common individual scale. Alternatively, the estimated PRI and correlation value of the overall report can automatically be set to the average of the estimated PRIs and correlation values provided by the two algorithms. In any event, the final estimated PRI and correlation value is provided in the overall report, along with the corresponding P/F status and associated pulses.

Further variations and embodiments could include, for instance, a triple vote, where pulse chains are subjected to a third PRI analysis technique (e.g., an effective averaging of the first two analysis techniques). Additional votes and analysis techniques may be added as desired. To better illustrate the benefit of multiple vote analysis mode, consider FIG. 4c, which illustrates both the benefits of the dual-vote method, and the drawbacks of not implementing this method.

FIG. 4c illustrates a table showing a specific case where both linear detection and linear regression were performed to provide a dual vote. In this specific case, the linear regression module 320 result incorporated "false pulses" from one signal train into another. For this case, two signals are present in the n pulses (n=8) presented to both linear detection module 310 and the linear regression module 320. The actual PRIs are 3.325 and 5.55 microseconds. The normalized pulse set is the set of TOA, normalized for processing. The LSB for the TOA is 20 nanoseconds. Multiplying 166.25 and 277.5 TOA units by 20 nanoseconds results in 3.325 microseconds and 5.55 microseconds PRI, respectively.

In more detail, the actual pulse train presented in iteration number 11 contains five pulses from the 3.325 microseconds PRI, which are: 0, 166, 333, 499, and 665 TOA in the set on n pulses. For which, all of these TOA values are approximately 166 TOA units apart from the next TOA in the sequence. Mask #20 and #37 selected 4 consecutive TOA from this set of 5, and resulted in very high quality correlation results for both linear detection (column 3) and linear regression (column 7).

There are three pulses from the 5.55 microseconds PRI, which are: 128, 406 and 683 TOA. For which, all of these TOA values are approximately 277 TOA units apart from the next TOA in the sequence. Masks #41 and #49 selected three pulses from the 3.325 microseconds PRI set, and one pulse from the 5.55 microseconds set. For the linear regression analysis, these two masks (41 and 49) both passed the P/F threshold (e.g., 10 units), and thus were considered in downstream PRI estimation processing. Note that a "wild mask" occurs when a mask passes threshold, but uses TOA data from multiple pulse trains. In many cases, the wild mask result may not be too far off from the correct result for one of the signals present, due to how close the TOA data from the other signal which have been used erroneously, are to the TOA data from another signal.

Note that the first PRI estimate provided by linear regression is not 166.35 (the average for the linear regression results for masks 20 and 37), but is 168.1333. This degraded the accuracy for the first PRI estimate due to the linear regression histogramming aspect including the false (wild) passing mask #41 in its' calculation of the average PRI value for its' first reported PRI value (166.4+166.3+171.7)/3=168.1333. In addition, the histogram section did not associate the PRI estimate from mask 49 (also a wild passing mask), therefore linear regression reported an erroneous second PRI of 183.1. Further note here that the downstream pulse association would flag that linear regression had produced an error condition, since several pulses would be associated to two different estimated PRI values, thus calling into question the entire linear regression answer for this case. This is due to pulses containing normalized TOA values of 333, 499 and 683 shown associated with both linear regression PRI values of 168.1333 and 183.1, respectively.

By enabling the dual vote mode, only the common passing masks from both linear detection and linear regression were used, and the correct answer of 1 PRI found at 166.3333 TOA units (3.33 microseconds estimated PRI when the LSB is applied), with pulses 1, 3, 4, 6 and 7 being associated with this signal train, would be issued. Note that this same answer was produced by linear detection alone for this trial. However, there are other cases where the reverse error condition is true with linear detection having some passing wild masks. The dual vote mode reduces or otherwise eliminates the potential for false positives due to wild masks.

Post Histogramming and PRI Filtering: Final Analysis

Figure 4D:
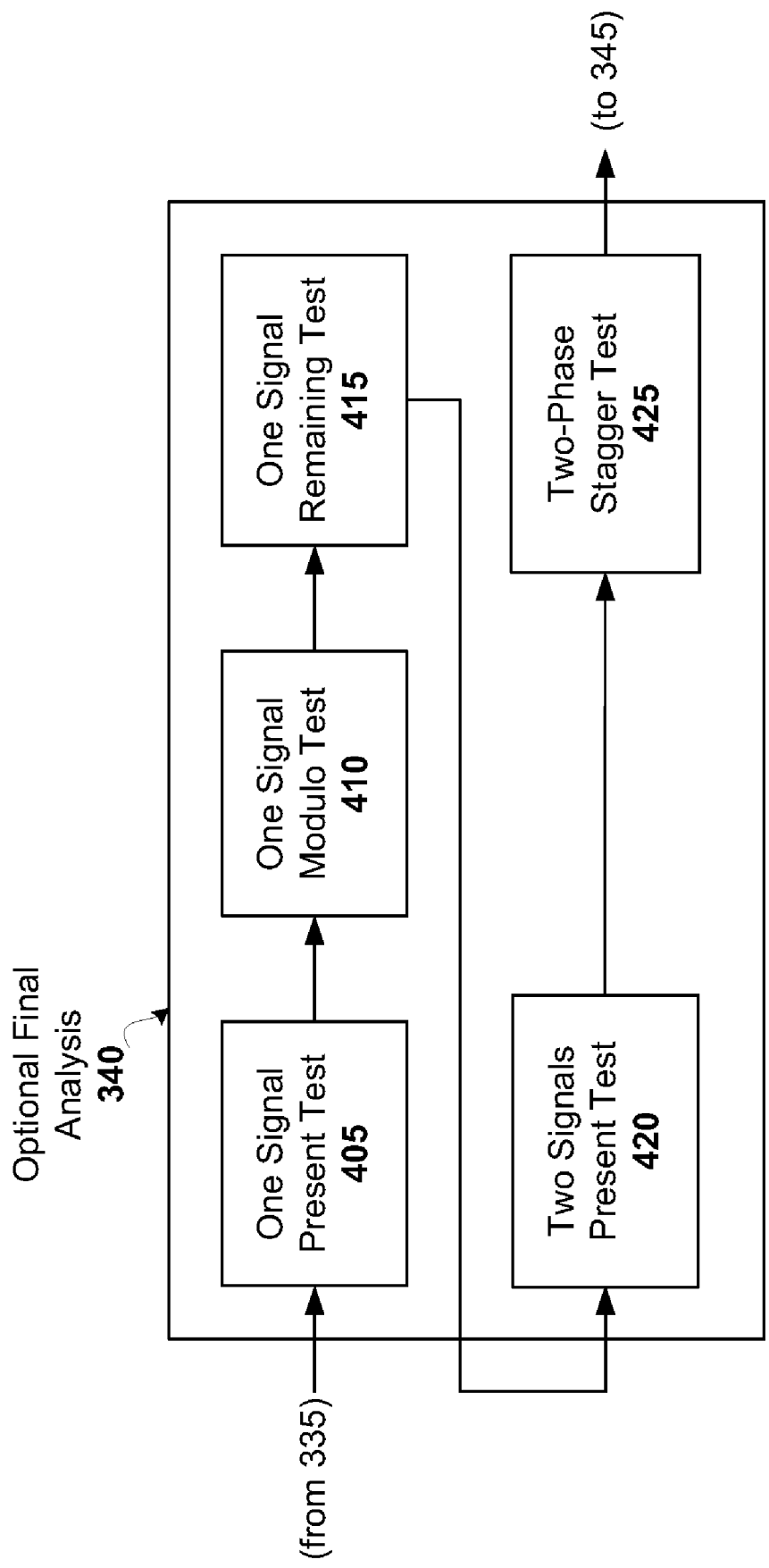
FIG. 4d is a block diagram illustrating a final analysis module configured in accordance with one embodiment of the present invention.

FIG. 4d is a block diagram illustrating a final analysis module 340 configured in accordance with one embodiment of the present invention. This particular module performs a one signal present test 405, a one signal modulo test 410, a one signal remaining test 415, a two signals present test 420, and a two-phase stagger test 425. Such a final analysis configuration is specific to cases where n is at least two times as large an m. Otherwise, the modulo test 410, the two signals test 420, and the two-phase stagger test 425 would not be practical.

This optional portion of the overall algorithm can be configured to include several to many rules/heuristic tests that assess the results of the prior analysis results provided by one of the linear detection, linear regression, or dual vote modes. The number and type rules/heuristic tests are dependent on the number of input pulses, n, and the number of required consecutive linear pulses, m.

For the most simplistic case where n=m, the only rule/heuristic test available is a determination as to whether the analysis provided by linear detection, linear regression, or dual vote, resulted in a passing correlation value or not. As m becomes increasingly less then n, more possible rules/heuristic tests become possible. For example, when m is exactly one-half of n, this allows for cases where the multiple correlation processor will be able to process cases where two radar signals can be present in the data set, allowing for analysis rules/heuristic tests to look for possible outcomes where the algorithm detects the presence of two linear signals within the same set of n pulses. The number of rules/heuristic tests can be constrained to be small, or large, and is a program specific implementation decision.

Thus, FIG. 4c provides for a reasonable set of rules/heuristic tests for the case where 8 pulses are processed by the multiple correlation processor looking in parallel for 4 consecutive linear pulses from the same radar transmission. The level of confidence of the various rules/heuristic test depends on the amount of conditions that are met with the results of the 70 mask decisions.

The one signal present test 405 looks for the number of passing masks results for the primary set of masks. In the 4-of-8 case, these are masks 1 through 5, which represent input pulses 1, 2, 3, and 4 for mask 1; 2, 3, 4, and 5 for mask 2; and so on. If the number of these masks is high (e.g., >3), then one linear signal has been found. This is because the input pulses (save for pulse 1 and 8) are used in multiple masks, and thus the likelihood of these pulses forming passing mask results and not being from the same radar transmission is extremely low.

The one signal modulo test 410 looks for the case where a "1×" PRI value pattern (e.g., 200 units) has been detected in a passing mask, along with a "2×" or "3×" PRI value being detected in another passing mask within the same set of 8 (i.e., n) pulses. This case easily occurs when all 8 pulses are from a stable linear signal. The primary masks in this case will all be presented with 4 consecutive linear pulses. In addition, the every other masks that use pulses (1, 3, 5, and 7) and (2, 4, 6, and 8) will also be presented with 4 consecutive 2× the PRI value for the same stable linear signal. When both this test and the one signal present test 405 pass, the level of confidence of the detection of single linear signal being present is extremely high.

The one signal remaining test 415 is a lower confidence test that is set to true, when no other test result is true, and at least 1 passing mask in the set of 70 masks has been found. This generally indicates one of the following conditions regarding the input data may be likely: 1) a linear signal has been found; 2) for the input pulse set of 8 pulses, more than 1 signal is present; 3) the input pulse data may contain some missing pulses, due to receiver measurement performance or multipath effects; 4) the input pulse data is not really a linear signal; or 5) the input pulse data used in the passing mask(s) may be mixed mode such that some pulses from one radar signal have been correlated in a linear fashion with some pulses from another radar signal. Note that the dual vote feature of the multiple correlation processor dramatically reduces the affect referred to in item 5, since both linear detection and linear regression would have to generate simultaneous false positive declarations of a linear signal presence for the same mask. Empirical evaluations to date using collected TOA data from an actual ESM receiver as well as synthetically generated TOA data have demonstrated that this condition appears to be rare. As previously stated, the one signal remaining test is a lower confidence test, and a conservative program approach may choose not to implement it. However, if dual-voting is employed, the level of confidence in this (and all tests) is increased dramatically.

The two signals present test 420 looks for the case when two different PRI results (from different passing masks) have resulted from the PRI histogramming section of the algorithm. This is a high confidence test. The two-phase stagger test 425 looks for the unique case where the every other pulse masks both result in the same or very close passing PRI value. For instance, given a 4-of-8-mask configuration, the most the set of masks with analysis will be able to decipher is two linear signals (each of their own PRI). In addition, if one signal is a two-phase stagger (with a first phase-second phase repeating pattern), then in eight pulses, the pattern would repeat itself four times, presenting again two sets of four linear patterns (every other pulse conditions) that would be a linear group-PRI for the 2-phase stagger. This is good confidence test, but may not be a viable choice for conservation program implementations, and instead could be left to be detected by the conventional signal processing techniques found within complex signal processing 125.

Other embodiments will be apparent in light of this disclosure. For example, an alternative final analysis 340 might include only the one signal present test 405. Further note that the analysis testing performed in module 340 could alternatively be integrated into the complex processing module 125. Depending on implementation preferences, module 340 can implement zero, one, or multiple analysis techniques as a part of the overall correlation algorithm.

Non-Linear Pattern Correlation

As will be apparent, the principles of the present invention can be extended to target non-linear pulse train patterns using the multiple parallel hypothesis masks described herein. This is viable because the aspect of selecting a set of m of n pulses and then determining if the m pulses fits a specific pattern, is generally independent of the type of pattern, assuming the pattern is not pseudo-random, random or highly jittered or chirped. One such non-linear pattern which can be detected by a system employing the present invention is a stagger interval pattern.

Consider, for example, the detection of two-phase stagger pattern. Assume a first pattern is represented as a "1-2-1-2" pattern, where the transmitter alternates the PRI using two different PRI values. This results in TOA deltas that alternate between TOA delta number 1 and TOA delta number 2. The alternate two-phase stagger pattern is represented as "1-2-2-1" which is continually repeated.

Rather than looking for one PRI to be found in the context of linear/stable patterns, the linear detection and/or linear regression algorithms are configured to look for two phases forming a 1-2-1-2 or 1-2-2-1 pattern. To do so, requires that the algorithms be expanded to predict two separate individual PRIs and arrange them in the 1-2-1-2 or 1-2-2-1 patterns. This requires a two-dimensional correlation multiple search pattern, whereas the approach for linear/stables implements a one-dimensional correlation multiple search pattern.

For stagger pattern detection mode in accordance with one embodiment of the present invention, a simplified set of linear masks (e.g., the first five primary masks—masks 1 through 5; as well as masks 48 and 49) were used. The same 8 pulse constraint was maintained (i.e., n=8). In the particular case of looking for a 1-2-1-2 or a 1-2-2-1 pattern, the algorithm assumes that 6 of 8 pulses were to be assessed for each individual stagger mask, providing a total of 28 mask sets. Given 8 pulses, there are three sets of 6 consecutive pulses (1 through 6, 2 through 7, and 3 through 8) that can be assessed. Note, however, that there are several additional mask sets that could have been used here, and the present invention is not intended to be limited to any one particular set.

Note that a linear stable is really a "1-1-1-1" repeating pattern, and "1-1-1-1" meets the definition of "1-2-1-2" and "1-2-2-1" patterns, where it just happens that both "1" and "2" for these two stagger patterns have the same TOA value. In any event, a multiple correlation processor based approach for staggers can readily be implemented. Although as the number of phases expands, the amount of processing will increase much more dramatically due to the need to search over the "n" numbers of individual TOA values, and the "m" number of possible ways that the "n" TOA data can be arranged in a repeatable manner.

Methodology

Embodiments for each of the linear detection, linear regression, and dual vote algorithms will now be discussed in reference to FIGS. 5a through 7. The linear detection method can be carried out, for example, by the linear detection module 310 discussed in reference to FIGS. 3 and 4a, while the linear regression method can be carried out, for example, by the linear regression module 320 discussed in reference to FIGS. 3 and 4b. The dual vote method can be carried out, for example, by the dual vote module 325 discussed in reference to FIGS. 3 and 4c. Each of these modules can be implemented in hardware (e.g., FPGA or ASIC) or software/firmware (e.g., programmed DSP processor).

Figure 5A:
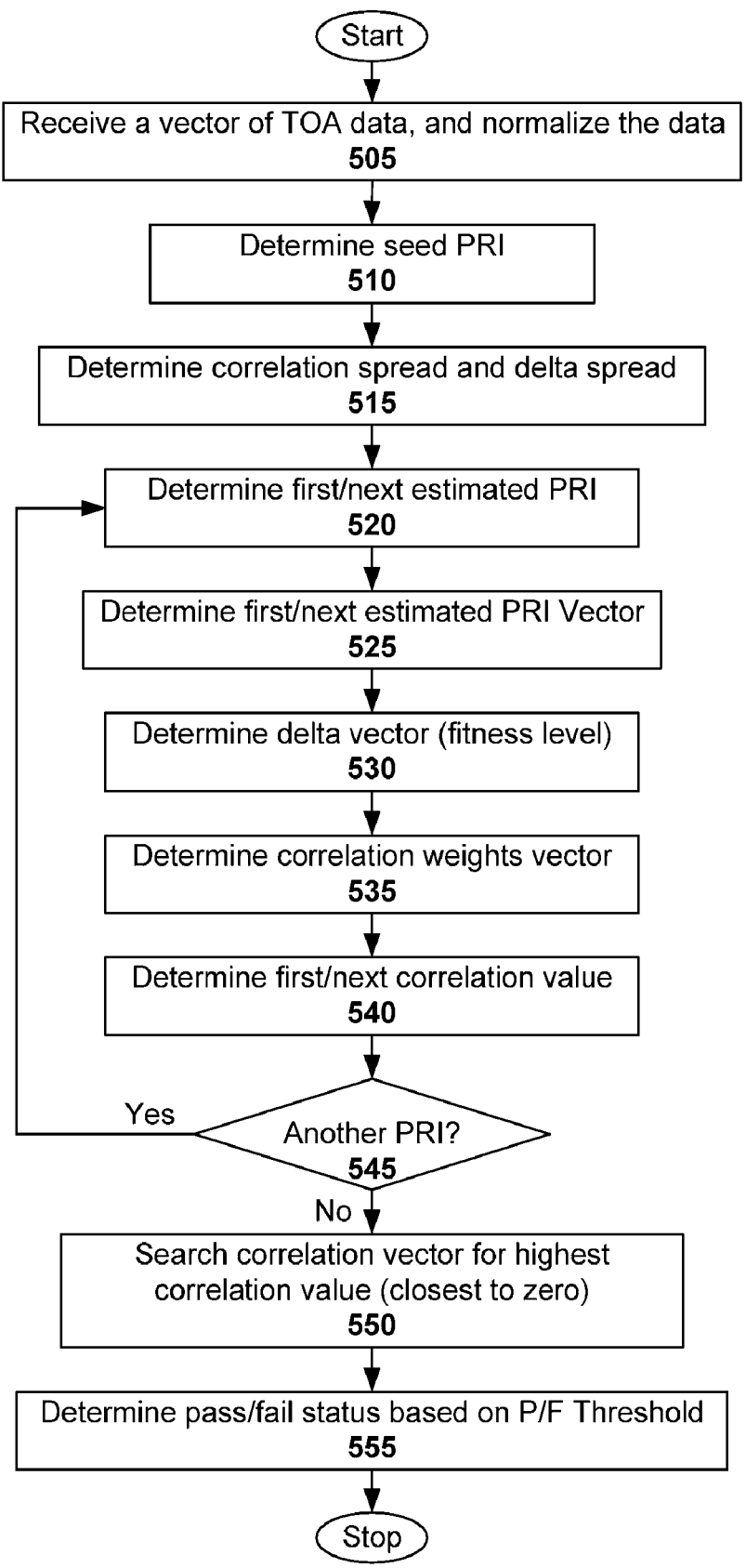
FIG. 5a illustrates a method for determining the correlation value associated with an estimated PRI using a linear detection algorithm in accordance with one embodiment of the present invention.

FIG. 5a illustrates a method for determining the correlation value associated with an estimated PRI using a linear detection algorithm in accordance with one embodiment of the present invention.

The method begins with receiving 505 a vector of TOA data (e.g., $v=TOA_1, TOA_2, \ldots, TOA_m$), and normalizing that data (e.g., $nv=TOA_1-TOA_1, TOA_2-TOA_1, \ldots, TOA_m-TOA_1$), thereby providing a normalized vector (nv) of TOA data. The method continues with determining 510 a seed PRI. In one embodiment, the seed PRI is determined by dividing each element of the normalized vector by m−1 (e.g., seed_pri=$nv_m$/(m−1)). FIG. 5b is a pictorial view of a normalized vector of m pulses, with a PRI of p, and an example seed PRI.

The method continues with determining 515 the correlation spread and the delta spread. The correlation spread can be determined by dividing the seed PRI by the correlation bandwidth % (e.g., spread=seed_pri*bw), and the delta spread can be determined by dividing the correlation spread by the "number of points" minus one (e.g., ds=spread/(npts−1)). The method proceeds with determining 520 the first/next estimated PRI (e.g., $PRI_{est}$=min_pri=seed_pri−(spread/2)). FIG. 5c is a pictorial view of estimated PRIs generated by the linear detection algorithm, along with the correlation spread, the delta spread, and the "number of points." Note that the correlation fit is assessed for each PRI estimate. Further note, as npts increases, there is in increase in likelihood that one of the estimated PRI trial values would closely approach the actual PRI value (for a linear signal). However, so too does the amount of computational load increase.

The method continues with determining 525 the first/next estimated PRI vector (e.g., ev=[0, min_pri, 2*min_pri, . . . (m−2)*min_pri, (m−1)*min_pri]). The method further includes determining 530 the delta vector, also referred to as the fitness level. The delta vector can be determined by subtracting the estimated PRI vector, ev, from the normalized vector of TOA data, nv (e.g., $dv=[0, nv_2-ev_2, nv_3-ev_3, \ldots nv_{m-1}-ev_{m-1}, nv_m-ev_m]$). The method further includes determining 535 the correlation weights vector, which can be achieved by squaring the delta vector (e.g., $wtv=[0, dv_2*dv_2, dv_3*dv_3, \ldots dv_{m-1}*dv_{m-1}, dv_m*dv_m]$).

Figure 5D:
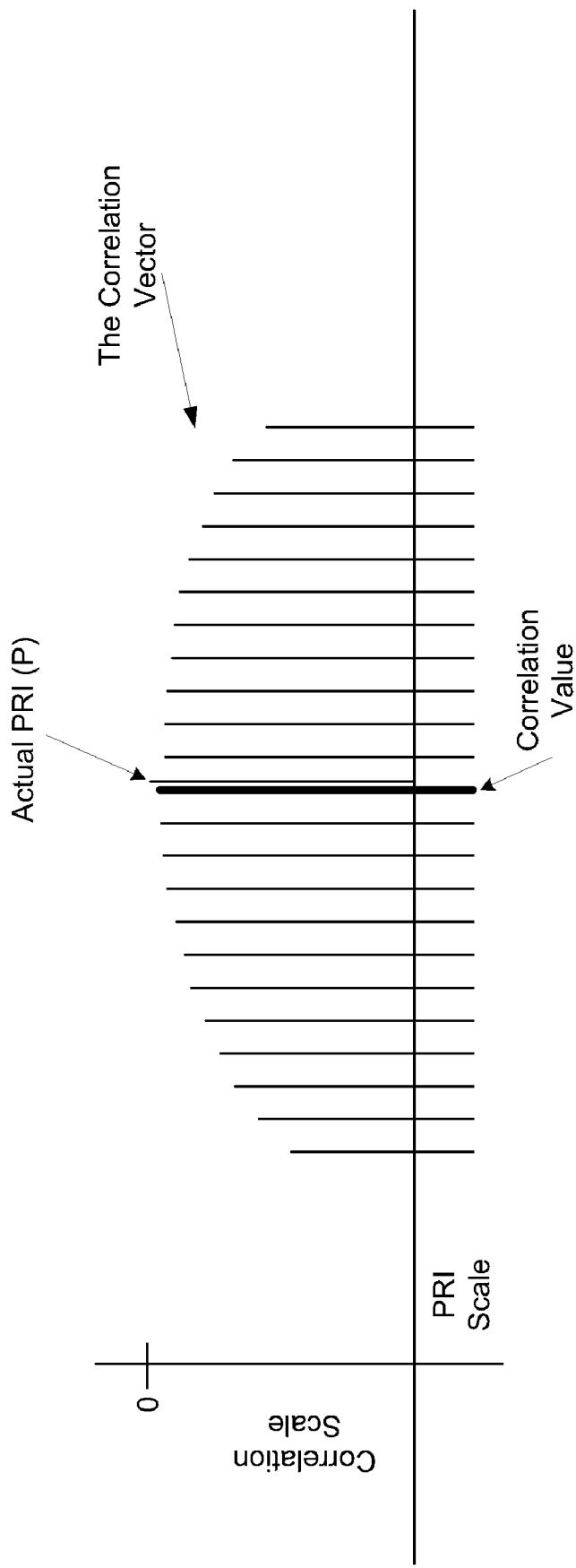
FIG. 5d is a pictorial view of a correlation value produced by the linear detection algorithm of FIG. 5a, along with the correlation vector and the actual PRI.

The method proceeds with determining 540 the first/next correlation value. In one embodiment, the correlation value is determined by dividing the sum of the correlation weights by the square of the seed PRI (e.g., $correlation_{est}=-[wtv_2+wtv_3+\ldots+wtv_{m-1}+wtv_m]/(seed\_pri*seed\_pri)$). FIG. 5d is a pictorial view of a correlation value produced by the linear detection algorithm of FIG. 5a, along with the correlation vector and the actual PRI.

As can be seen, a determination 545 is made as to whether there are additional PRIs to estimate. If so, then steps 520 through 545 are repeated accordingly. Once all possible PRIs estimates have been assessed (e.g., by linear detection, linear regression, or dual vote), along with the respective correlation values, the method proceeds with searching 550 the correlation vector, which includes a number (npts) of estimated PRIs, for the highest or "best" correlation value (e.g., the correlation value closest to zero). The method proceeds with determining 555 the pass/fail status based on the known P/F threshold.

In one particular embodiment, the best correlation value is compared to the P/F threshold. If the best correlation value is greater than or equal to the pass/fail threshold, then a passing status is set (indicative of linearity). Otherwise, a failed status is set. The resulting linear detection report includes the P/F status, the best correlation value and the PRI estimate that corresponds to the correlation value, and the associated pulses.

Figure 6:
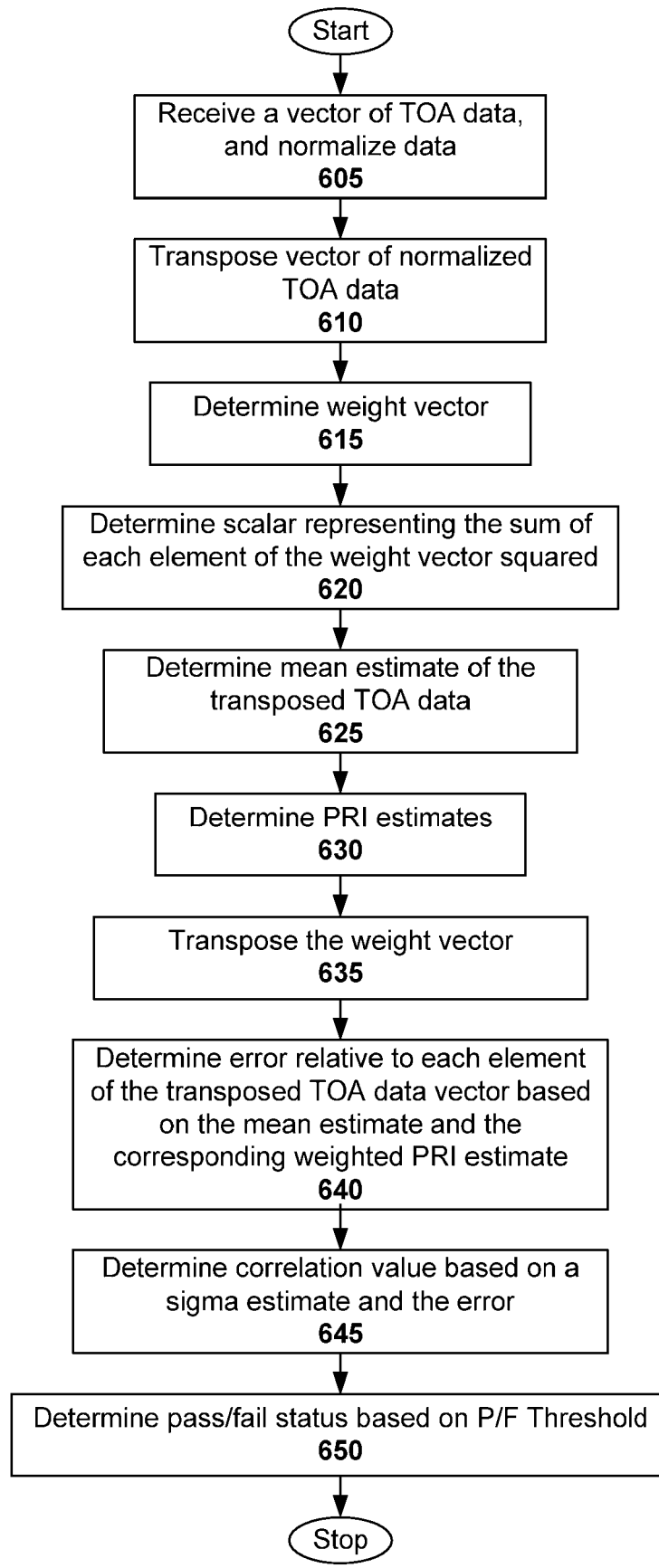
FIG. 6 illustrates a method for determining the correlation value associated with an estimated PRI using a linear regression algorithm in accordance with another embodiment of the present invention.

FIG. 6 illustrates a method for determining the correlation value associated with an estimated PRI using a linear regression algorithm in accordance with another embodiment of the present invention.

The method begins with receiving 605 a vector of TOA data, and normalizing that data. This can be performed as discussed in reference to step 505 of FIG. 5a, and FIG. 5b. The method continues with transposing 610 the vector of normalized TOA data, and determining the weight vector. The transpose is performed using matrix algebra, while the weight vector can be determined as follows: $wv=0.5*[(1-m), (1-m+2), (1-m+4), \ldots (m-1)]=[w_1, w_2, \ldots w_m]$. Note that the weight vector has m entries, each entry being 1.0 unit larger than the previous. Further note that the weight vector can be pre-calculated as the weights are not dependent on the TOA data.

The method further includes determining 620 a scalar representing the sum of each element of the weight vector squared (e.g., scalar=$1.0/(sum(weight**2))=1.0/[w_1^2+w_2^2+\ldots+w_m^2]$). The method proceeds with determining 625 the mean estimate of the transposed TOA data (e.g., mean_estimate=$sum(y)/m=[T_1+T_2\ldots T_m]/m$), and determining the PRI estimates. The PRI estimates can be determined as follows:

$$PRI\_estimate = scale*weight*y = scale*[w_1, w_2, \ldots w_m]*[T_1, T_2, \ldots T_m].$$

The method further includes transposing 635 the weight vector (using matrix algebra), and determining 640 the error relative to each element of the transposed TOA data vector based on the mean estimate and the corresponding weighted PRI estimate. For example, the error can be calculated as follows: error=y−mean_estimate−PRI_estimate*wt, where y is the transposed vector of normalized TOA data (from 610) and wt is the transposed weight vector (from 635). In expanded form:

$$\text{error} = [T_1 - \text{mean\_estimate} - \text{PRI\_estimate} * w_1,$$
$$= [e_1 T_2 - \text{mean\_estimate} - \text{PRI\_estimate} * w_2, e_2 \ldots T_n -$$
$$\text{mean\_estimate} - \text{PRI\_estimate} * w_m]$$
$$= e_m].$$

The method continues with determining 645 the correlation value based on a sigma estimate (quality factor) and the error (e.g., correlation value=sigma_estimate=[sum(error$_2$)/m]$^{1/2}$=[($e_1^2$+$e_2^2$...+$e_m^2$)/m]$^{1/2}$). The method proceeds with determining 650 the pass/fail status based on P/F Threshold. For example, the sigma estimate>=P/F threshold, then a pass status is set. Otherwise, a failed status is set. The correlation value, along with the corresponding PRI estimate, the P/F status, and the associated pulses are provided in the linear regression report.

Figure 7:
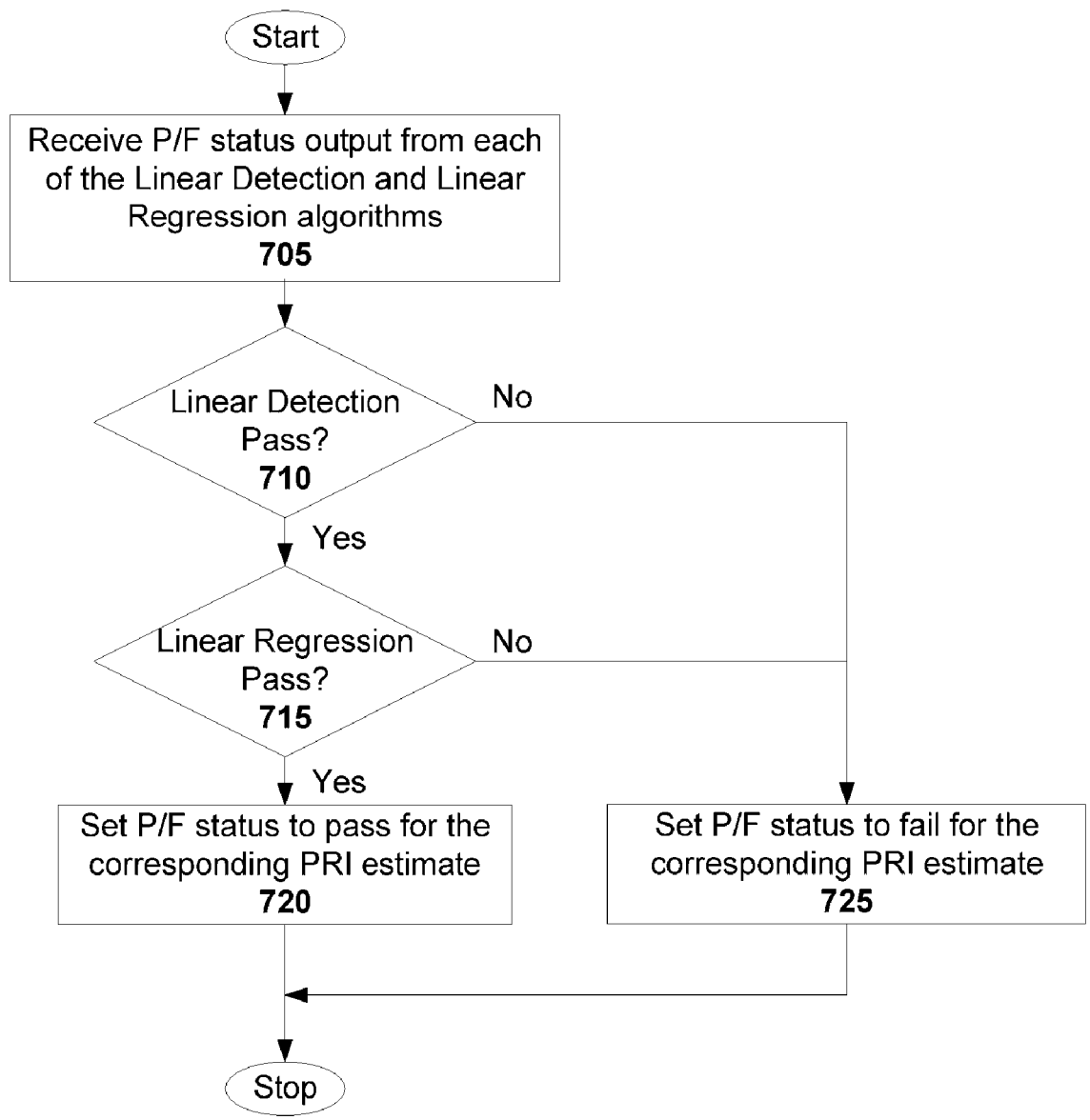
FIG. 7 illustrates a method for determining the correlation value associated with an estimated PRI using a dual vote algorithm in accordance with another embodiment of the present invention.

FIG. 7 illustrates a method for determining the correlation value associated with an estimated PRI using a dual vote algorithm in accordance with another embodiment of the present invention. The method assumes that at least two distinct PRI analysis types were conducted, and the P/F status of each analysis is available. In one particular embodiment, the analysis types include linear detection and linear regression as previously discussed.

The method begins with receiving 705 P/F status output from each of the linear detection and linear regression algorithms. A determination 710 is made as to whether the estimated PRI provided by linear detection passed, as well as a determination 715 as to whether the estimated PRI provided by linear regression passed. As previously explained, these determinations can be made simultaneously by a logic gate adapted to receive the P/F status from each analysis type. Alternatively, the determinations 710 and 715 can be made sequentially or otherwise independent of one another. The respective P/F statuses can then be provided to a dual vote software routine that is programmed to wait for each vote to arrive. Other configurations will be apparent in light of this disclosure, and the present invention is not intended to be limited to any one such embodiment.

If it is determined that each type of analysis passed, then the method proceeds with setting 720 the P/F status to pass for the corresponding PRI estimate. On the other hand, if it is determined that one or both types of analysis failed, then the method proceeds with setting 725 the P/F status to fail for the corresponding PRI estimate. In one embodiment, when dual-vote passes, the PRI estimate that is reported is one of the following: the PRI estimate produced by either analysis (e.g., default could be set to a particular type), or the average of the PRI estimates provided by each analysis type.

Note that each of the methods described in FIGS. 5a-7 can be run in a multiple correlation process as described herein, with each algorithm operating on a particular set of pulses or mask set (e.g., m-of-n configuration). Alternatively, each algorithm can be run in a singular fashion, where all of the pulses of the received pulse train are analyzed by one instance of each algorithm (e.g., n-of-n configuration).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A linear detection method for determining correlation values associated with an estimated Pulse Repetition Interval (PRI) executed by a linear detection module of a correlation mask disposed on a digital signal processor, comprising:
   determining a correlation spread associated with a vector of Times-of-Arrival (TOA) data;
   determining a delta spread associated with the correlation spread;
   determining a first/next estimated PRI associated with the vector of TOA data;
   determining a first/next estimated PRI vector based on the first/next estimated PRI;
   determining a delta vector based on the first/next estimated PRI vector;
   determining a correlation weights vector based on the delta vector;
   determining a first/next correlation value based on the correlation weights vector; and
   in response to there being no additional PRIs to estimate, searching the correlation values for a highest correlation.

2. The method of claim 1 further comprising:
   receiving the vector of TOA data;
   normalizing the vector of TOA data, thereby providing a normalized vector of TOA data; and
   determining a seed PRI associated with the vector of TOA data.

3. The method of claim 2 wherein determining the seed PRI includes dividing each element of the normalized vector by m−1, where m=the number of pulses in the vector of TOA data.

4. The method of claim 2 wherein determining the correlation spread includes dividing the seed PRI by a correlation bandwidth percentage that defines a percentage bandwidth for searching for the estimated PRI.

5. The method of claim 2 wherein determining the first/next estimated PRI includes subtracting (correlation spread /2) from the seed PRI.

6. The method of claim 2 wherein determining the delta vector includes subtracting the estimated PRI vector from the normalized vector of TOA data.

7. The method of claim 2 wherein determining the first/next correlation value includes dividing the sum of the correlation weights by the square of the seed PRI.

8. The method of claim 1 wherein determining the delta spread includes dividing the correlation spread by a number of point (npts)−1, where npts defines the number of points to search for the estimated PRI.

9. The method of claim 1 wherein determining a correlation weights vector includes squaring the delta vector.

10. The method of claim 1 further comprising repeating the determining steps for additional PRIs.

11. The method of claim 1 further comprising comparing the highest correlation value to a pass/fail threshold to determine a pass/fail status.

12. The method of claim 11 further comprising determining a second pass/fail status for a correlation value associated with an estimated PRI using a linear regression algorithm and setting a final pass/fail status if said pass/fail status is passing and said second pass/fail status is passing.

13. The method of claim 1 further comprising providing a linear detection report that includes at least one of a pass/fail status, the highest correlation value, a PRI estimate that corresponds to the highest correlation value, or pulses associated with the PRI estimate.

14. The method of claim 1 wherein said method is run in a multiple correlation processor, and wherein said method is run on one of the group consisting of a set of pulses, a mask set, and a singular fashion for all pulses of a pulse train.

15. The method of claim 1 wherein the correlation values are assessed by at least one of the group consisting of the linear detection method, linear regression method, and dual vote method.

16. The method of claim 1 further comprising processing in an operation mode selected from at least one of the group consisting of batch mode, stream mode, loop back mode, and tracker mode.

* * * * *

UNITED STATES PATENT AND TRADEMARK OFFICE
CERTIFICATE OF CORRECTION

PATENT NO. : 7,657,588 B2 Page 1 of 1
APPLICATION NO. : 11/458963
DATED : February 2, 2010
INVENTOR(S) : Joseph A Sirois It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Twenty-eighth Day of December, 2010

David J. Kappos
*Director of the United States Patent and Trademark Office*